GEORGE L. ATWATER.
Improvement in Children's Carriages.
No. 127,404.             Patented June 4, 1872.
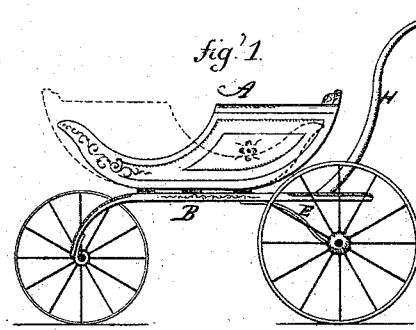
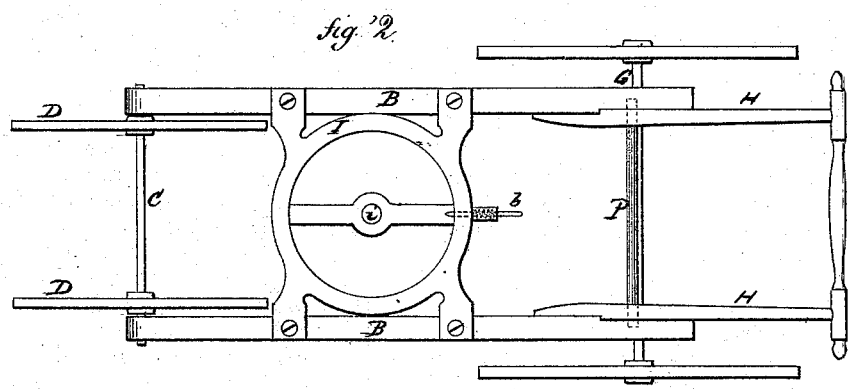
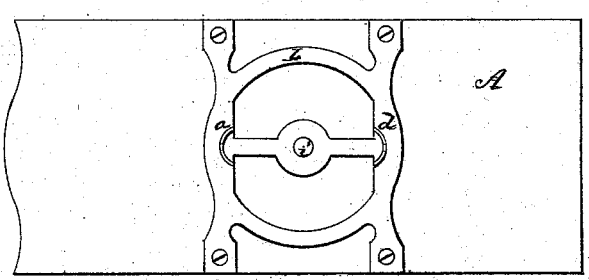

UNITED STATES PATENT OFFICE.

GEORGE L. ATWATER, OF NEW HAVEN, CONNECTICUT, ASSIGNOR TO THE NEW HAVEN FOLDING-CHAIR COMPANY, OF SAME PLACE.

IMPROVEMENT IN CHILDREN'S CARRIAGES.

Specification forming part of Letters Patent No. 127,404, dated June 4, 1872.

*To all whom it may concern:*

Be it known that I, GEORGE L. ATWATER, of New Haven, in the county of New Haven and State of Connecticut, have invented a new Improvement in Children's Carriages; and I do hereby declare the following, when taken in connection with the accompanying drawing and the letters of reference marked thereon, to be a full, clear, and exact description of the same, and which said drawing constitutes part of this specification, and represents, in—

Figure 1, a side view of the carriage; Fig. 2, a top view of the running-gear and frame enlarged; and in Fig. 3 an under-side view of the carriage-body.

This invention relates to an improvement in that class of children's carriages in which the body is constructed to be turned upon a center, so as to be reversed relatively to the handles by which the carriage is driven. Heretofore the body of these carriages has been arranged upon a frame pivoted to the forward axle independent of the frame proper or running-gear of the carriage, and so that to remove the body the handles and frame upon which the body is pivoted must be raised in order that in turning the body it will clear the rear or larger wheels. To this construction there are serious objections. It inconveniences or disturbs the occupant, and makes it exceedingly difficult for one person to lift, and at the same time reverse, the body. To overcome these difficulties, and at the same time improve the construction of the carriage, is the object of this invention; and it consists in constructing the frame of the running-gear relatively to the body, so that the body may be pivoted directly to the running-gear, and clear the wheels in turning; also, in the permanent attachment of the push-handles to the running-gear or frame independent of the body; also, in the arrangement of a turn-table upon the frame, forming a bearing for the body to rest and be turned upon.

A is the body; B B, the two sides of the frame, to the forward ends of which the axle C of the wheels D D is attached, the rear ends of the two sides connected by a spring, E, to the rear axle G. This frame connects the forward and rear axles independent of the body, and to this frame the push-handles H H are attached or made a part, so that the said push-handles are free and independent of the body. The frame B, by means of the springs E and its curved forward end, in connection with the axle, lies in nearly or quite a level position, and is of sufficient height to allow the body A pivoted thereon to turn clear of the rear or highest wheels, as seen in Fig. 1, without raising the body from its natural position. The body being pivoted in a central position to the frame, may thus be reversed without the necessary movement of other parts of the carriage, and consequently may be done by a single hand. To sustain the frame B at the rear, a rod or bar, P, (see Fig. 2,) extends from one side to the other, firmly attaching the two sides together, and making them practically one. To pivot the body to the frame and afford a substantial bearing, I construct a turn-table, I, of circular form, and connected to the frame, as seen in Fig. 2, a central bearing, *i*, being formed therein. On the body a similar plate, L, is secured, the two circles lying one upon the other, the centers *i* forming the pivot upon which they turn, but the circles forming the bearing or support. Thus a large and firm support is given to the carriage, and the strain which would otherwise come upon the center is taken by the said circles, and this support is of great importance in turning the body. To secure the body in either position a lug, *a*, is formed upon one side, and upon the opposite side a corresponding lug, *d*, on the body-plate, which sit within the circle on the frame. On the frame we arrange a sliding or spring bolt, *b*, which enters a seat or notch in either of the said lugs, as they are presented to the said bolt when the carriage is in either of its two positions, forward or back.

I do not wish to be understood as broadly claiming a reversible carriage-body, as such is not new, as may be seen in the patent of John B. Wightman, June 13, 1871, of which said patent the assignees of the present invention are the owners, and in the said patent the difficulties which we have pointed out as existing will be found, and which by this invention are entirely overcome.

Claims.

1. The frame B B, connected to the forward axle, and, by the springs E, to rear axle, and in such relative position to the wheels that the body A pivoted on said frame may be reversed clear of the wheels without raising the body, substantially as described.

2. The carriage running-gear, consisting of the frame B B, connected directly to the forward axle, and by the springs E to the rear axle and the push-handles H H, all independent of the body, substantially as set forth, and with or without the bar P.

3. The turn-table I attached directly to the frame B, and to the center of which the body A is pivoted, and so as to be turned thereon, the circle I forming the bearing, substantially as set forth.

4. In combination with the subject-matter of the third clause of claim, I claim the spring or slide-bolt $b$ to secure the body upon the said turn-table in either of its two positions, substantially as set forth.

GEO. L. ATWATER.

Witnesses:
CHAS. P. AUGUR,
S. H. BRAY.